United States Patent [19]

Geske

[11] Patent Number: 4,742,872
[45] Date of Patent: May 10, 1988

[54] HELICALLY WRAPPED WIRE SCREEN ASSEMBLY AND FITTING THEREFOR

[75] Inventor: Bruce R. Geske, Fridley, Minn.

[73] Assignee: Signal Environmental Systems Inc., New Brighton, Minn.

[21] Appl. No.: 893,174

[22] Filed: Aug. 5, 1986

[51] Int. Cl.$^4$ ............................................. E21B 43/08
[52] U.S. Cl. ........................... 166/231; 29/163.5 CW; 210/497.1
[58] Field of Search ............... 166/227, 231, 232, 157, 166/233, 158, 205; 29/163.5 CW, 163.5 F; 210/497.1, 494.2

[56] References Cited

U.S. PATENT DOCUMENTS

| | | | |
|---|---|---|---|
| 899,054 | 9/1908 | Johnson | 166/231 |
| 2,111,680 | 3/1938 | Tow | 166/227 |
| 2,341,783 | 2/1944 | Jens | 210/497.1 |
| 4,042,262 | 8/1977 | Mooney et al. | 285/98 |
| 4,298,221 | 11/1981 | McGugan | 285/328 |
| 4,428,423 | 1/1984 | Koehler et al. | 166/231 |

Primary Examiner—Leppink James A.
Assistant Examiner—Hoang C. Dang
Attorney, Agent, or Firm—Barry L. Clark

[57] ABSTRACT

The invention relates to a novel tubular fitting member formed of a deformable material, such as steel, which may be combined with a helically wrapped wire screen to produce a mechanical seal of a gap formed adjacent the cut-off end portion of the screen when the screen is cut off perpendicular to its supports. Such cutting produces a loose, tapered wire tail which is normally broken off, thereby producing an open gap in the screen which is wider than the width of the slot between the wire wraps. The tubular fitting member has a groove formed in its outer surface closely adjacent to the screen end of the fitting. The groove defines the inner wall of a deformable flange which may be selectively forced toward the screen to close any gap formed adjacent its end during the cut-off operation.

2 Claims, 1 Drawing Sheet

4,742,872

HELICALLY WRAPPED WIRE SCREEN ASSEMBLY AND FITTING THEREFOR

BACKGROUND OF THE INVENTION

The invention relates to wire wound screens, and particularly to such screens which are made by helically wrapping a single strand of formed wire about a plurality of widely spaced apart wire rods arranged parallel to each other in the shape of a cylinder. Typically, the wire is wedge-shaped having a rather wide, flat top portion and tapered sides which converge toward each other at a rather narrow bottom portion where the wire is welded, or otherwise attached, at each intersection it makes with a rod. In the completion of such screens, the screen cylinder is generally cut to length in a plane perpendicular to the screen axis and is then attached by welding to a sleeve type fitting. Such a perpendicular cut of the helically wrapped wire, which might typically be wound at a helix angle of about 0.5 degrees, will cause the end of the wire to be cut in a long, tapered manner, so that it terminates in a feather-like tip. This wire end, or tail, can be fragile, and is commonly peeled back from those rods to which its bottom edge is no longer attached by welding, and then broken off. It is also usually peeled away from any rod or rods which have so little left of the weld joint that the tail is not firmly retained. Once the loose tail of the screen wire has been removed, the screen is ready to be attached to end fittings which permit it to be joined to sections of pipes or other screens, for example. The least expensive and most desirable type of end fitting is a cylindrical section of tubing which can be welded to the screen. However, it will be obvious that when such a cylindrical fitting and a length of helically wrapped screen, each of which has been cut off at right angles to its axis, are placed in aligned abutting contact with each other, a gap will exist in the region where the loose tail of the wrap wire was broken off. Furthermore, the gap will have a dimension which is considerably larger than the dimension of the narrow slot formed between the adjacent wraps of wire in the wrapping operation. Since any opening larger than the screen slot width would permit particles of an undesired size to pass through the screen, it is of course necessary to seal such an opening. The customary practice has been to fill such a gap with weld filler metal, or to employ a sleeve-type fitting which has an enlarged diameter end portion which can overlie the end portion of the screen, including the gap portion. Neither practice is ordinarily desirable.

In the case where the gap is to be filled with weld metal, additional labor is necessary, and quality is dependent upon operator skill and care. Furthermore, with screens made of fine wires, it is very difficult to fill the gap without damaging the screen.

Sleeve-type fittings are only used in certain instances where the application can tolerate the increase in outside diameter of the assembly. Also, formed sleeve-type fittings are expensive compared to conventional fittings cut from tubing.

SUMMARY OF THE INVENTION

It is among the objects of the present invention to provide a fitting which can be welded to the support rods of a helically wound wire screen assembly in the conventional manner but which can be made to function so as to mechanically close any gap between the cut end of the screen and the fitting sufficiently that no opening exists which exceeds the slot width of the screen.

It is another object of the invention to provide a fitting for a cylindrical screen assembly which can serve to provide an effective mechanical seal with the screen but which has an outer diameter no greater than the outer diameter of the screen.

Yet another object of the invention is to provide a fitting for a screen assembly formed of helically wrapped wire, wherein the fitting is formed of a deformable material, a portion of which can be moved axially away from the main body portion of the fitting to close, or at least substantially close, any gap existing between the fitting and a screen due to the removal of a loose end of the helically wrapped wire which forms the screen when the screen is cut to its desired final length prior to the attachment of the fitting.

The foregoing and other objects and advantages are achieved by the improved fitting of the present invention. The fitting preferably comprises a relatively short section of cylindrical tubing made of a deformable material such as steel. It is also preferable that it has an inner diameter which is no less than that of the screen and an outer diameter which is no greater than that of the screen. A groove is formed in the outer surface of the tubing at a short distance from the end thereof which is to be attached to the screen assembly, and defines a flanged end portion. Although it is generally easiest to form the groove completely around the periphery of the tubing, it would be sufficient to groove only a portion of the periphery. However, in the latter situation, it would be necessary to circumferentially align the grooved portion of the tubing with the portion of the screen containing the gap where the tapered wire tail had been broken off. Once the fitting and screen are axially butted together and aligned as noted supra, the support rods of the screen are preferably welded to the inner end of the fitting. At this time, an appropriate tool, such as a revolving swaging tool, can be placed into the groove and pressure applied thereto so as to force the deformable flanged outer end portion of the tubing, which is also the outer wall of the groove, to move against the end of the screen. In the region of the gap, the screen will offer no resistance. Thus, the deformed flanged end portion of the fitting can be moved toward the closest screen wire to close the gap sufficiently that it will not exceed the normal slot dimension of the screen. Furthermore, in the region of the new end of the wrap wire which remains after the tail is removed, the width of the wire is reduced by the cutting off operation. The reduced width wire will not be able to offer too much resistance to the force applied by the deformed flanged end portion of the fitting and will tend to bend over so as to at least partially close the slot between itself and an adjacent screen wire wrap. Obviously, if the fitting is grooved completely around its periphery, there would be no need to circumferentially align the fitting with the screen.

DETAILED DESCRIPTION OF THE DRAWINGS

Figure 1:
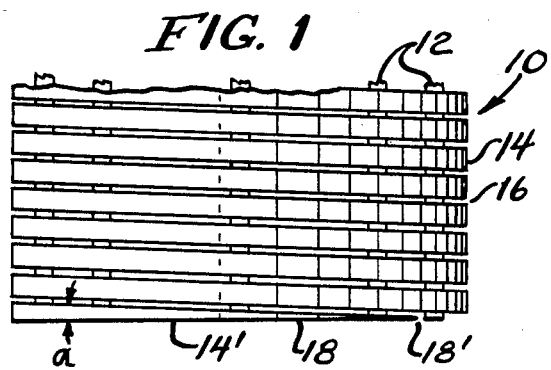
FIG. 1 is a fragmentary side view of a cylindrical screen which has been cut to length in a plane normal to its axis.
Figure 2:
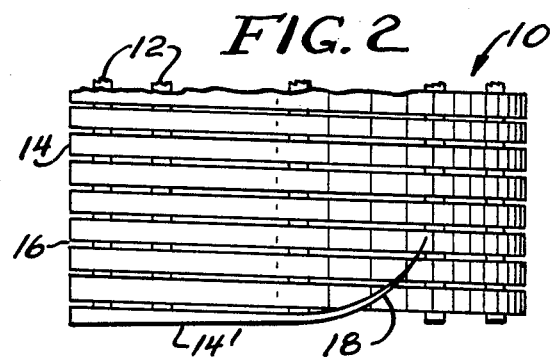
FIG. 2 is identical to FIG. 1 except that it shows a loose tapered tail of wire which is usually broken off.
Figure 5:
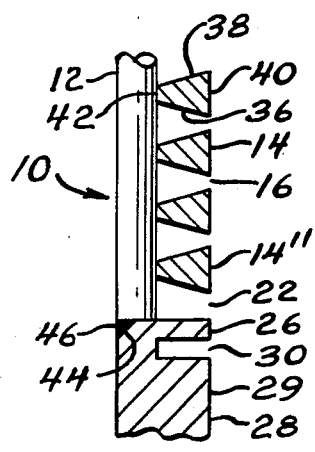
FIG. 5 is a sectional view taken on line 5—5 of FIG. 3 which illustrates how the gap formed as a result of the breaking off of the tail of the wrap wire is larger than the width of the screen slots.

FIGS. 1 and 2 illustrate a typical cylindrical well screen assembly, indicated generally at 10, which has a base comprising a plurality of circumferentially arranged support rods 12. Other types of bases, such as a perforated pipe or channel-shaped support members, for example, could also be used. Helically wrapped around the plurality of rods 12 is a continuous wedge-shaped wire member 14 which is welded to the rods and wrapped so as to provide a slot opening 16 of uniform width throughout the length of the screen assembly 10. The screen assembly 10 is shown with its lower end cut off at an angle normal to its axis. Since the wire member 14 is wound helically at an angle $\alpha$, its lowermost wrap 14' will have an end portion 18 which tapers down to a feather-like tip 18'. The end portion 18 is shown in FIG. 2 as turned up, to illustrate the fact that it is not welded to one of the rods 12. The reason that it is not welded is that, as best seen in FIG. 5, the wedge-shape of the wire allows a portion of the relatively wide outer surface 40 of the wire to remain when the narrow inner tip portion 42 that was welded to one of the rods 12 has been cut away. It is common practice to cut off or break away the end or tail portion 18 which is not welded to a support rod 12 and sometimes to also break away a little more of the wire if there is so little left of its weld to a support rod that it is in danger of coming loose.

Figure 3:
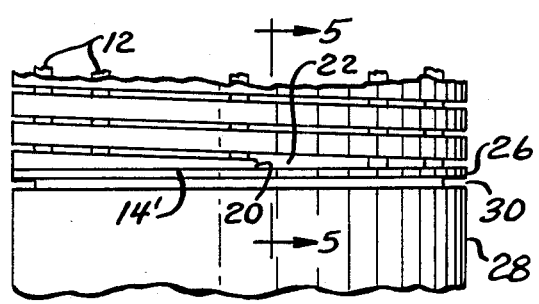
FIG. 3 shows the screen of FIG. 1 or 2 after it has first been affixed to a fitting made in accordance with the invention and after the loose tapered tail of wire has been broken off, thus forming a gap adjacent the fitting having a width greater than the screen slot width.

FIG. 3 shows the screen 10 after the tail portion 18 has been broken away to define a new end portion 20 on the lowermost wrap 14'. A gap or opening portion 22 is also formed where the tail portion 18 is broken away, and this gap has a width, in the direction of the screen axis, which is greater than the width of screen slot 16. The figure also shows the screen in axial alignment with a deformable flanged end portion 26 of a tubular end fitting member 28. The main body portion 29 of the end fitting member 28 is spaced from the flanged end portion 26 of the fitting by a groove 30. The groove 30 and end portion 26 are shown in their original non-deformed configurations adjacent the lowermost wrap 14' of the screen. It will be readily obvious that the screen 10 would be of little or no value for use as a filter if the gap 22 were allowed to remain. As previously discussed, the gap could be filled with weld filler metal but such a solution is undesirable.

Figure 4:
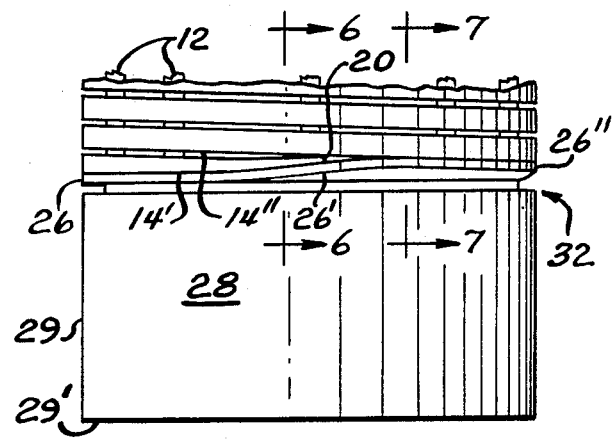
FIG. 4 is similar to FIG. 3 except that a narrow flange, which defines a portion of the end of the fitting, and which also defines one wall of the groove in the fitting, has been defined toward the screen to at least substantially fill the gap and force at least an end portion of the lowest wire wrap toward the adjacent wire wrap.

FIG. 4 illustrates a finished screen and fitting assembly which is indicated generally at 32. The figure shows how the deformable end flange portion 26 can be moved away from the body portion 29 of the fitting member 28 and against the lowermost wrap 14' of the screen member 10. This movement, which is preferably made by forcing the flange portion 26 outwardly with a suitable tool, such as a revolvable swaging tool, not shown, will cause the narrow portion 14' of the wire member 14, which is barely attached to the support rod 12, to bend and move closer to the adjacent wire wrap 14" in the region to the right of section line 6—6. For example, flange portion 26' can be seen as holding the end portion 20 of wire wrap 14' against the adjacent wire wrap 14". At the same time, the portion 26" of the flange portion 26, which is aligned with the gap portion 22, will itself move into contact with the adjacent wrap wire 14" so as to effectively close the gap 22. Although the lower end 29' of the fitting 28 is shown as being plain, it could be of any desired shape, or threaded.

Figure 6:
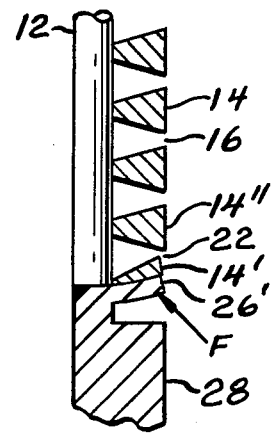
FIG. 6 is a sectional view taken on line 6—6 of FIG. 4 which illustrates how a section of the end wrap of wire, which has been thinned down and weakened in the cut-off operation, will be pressed toward the adjacent wrap of wire by the force applied to it by the deformed end flange portion of the fitting.
Figure 7:
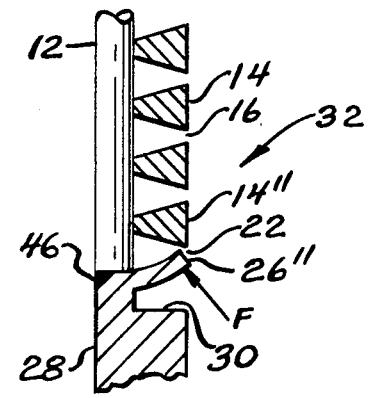
FIG. 7 is a sectional view taken on line 7—7 of FIG. 4 which illustrates how the deformed flange portion of the fitting functions to close the gap that was shown in FIG. 5.

FIGS. 5–7 illustrate the relationship between the fitting end flange portion 26 and the screen assembly 10 as the end flange portion 26 is moved between its initial FIG. 5, non-deformed configuration, and its FIG. 6 and FIG. 7 deformed configuration. In FIG. 5, the fitting end flange portion 26 can be seen as being defined by the outer wall of a groove 30 formed in the fitting 28 which separates the flange portion 26 from the body portion 29. The groove is formed of a sufficient depth to allow the flange portion 26 to be deformed outwardly but must not be so deep as to adversely weaken the fitting 28. The figure shows a portion of the screen 10 where the end wrap tail 18 has been broken away so that the gap 22 between wrap wire portion 14" and the fitting flange 26 is of a larger dimension than the screen slots 16. As seen in FIG. 7, the gap 22 is reduced to a size less than that of the slots 16 when the flange portion 26" is moved by a force "F" toward the wrap wire portion 14". FIG. 6 shows the thinned and weakened lowermost wire wrap portion 14' being bent when contacted by flange portion 26' so as to move closer to the adjacent wrap wire portion 14". This movement of portion 14' allows the gap 22 to be more completely closed. The portion 14' is thinned and weakened because the wrap wire 14 has a wedge shape, as shown in FIG. 5. The sides of the wire 14 are tapered as shown at 36, 38 between a relatively wide outer surface 40 and a relatively narrow inner surface 42. The narrow inner surface 42 is welded to the rods 12 at each intersection therewith but the strength of the weld is of course weakened when a major portion of the width of the wire has been cut away, as is evident in the cross-section of the wire portion 14' shown in FIG. 6. To maintain the inside surfaces of the screen 10 and fitting 28 relatively smooth and of a uniform diameter, the body member 28 is chamfered under the flange portion 26 at 44 for receipt of the weld 46 which holds the support rods 12 to the fitting.

Although the invention has been discussed in connection with cylindrical screens, it is obvious that its teachings could be extended to non-cylindrical screens also. For simplicity of manufacture, flat screens are usually made by cutting and flattening a helically wrapped cylindrical screen. Even though the wires and support rods are not at right angles, it is sometimes permissable to form a flat screen by cutting the rods in a direction parallel to the wires rather than at right angles to the rods. In this case, there would be no problem in welding a frame to the screen assembly since there would be no wire tails or gaps. However, in flat screen applications in which the screen must be cut squarely with the support rods, and the framing for the screen assembly must be affixed to the ends of the rods and generally parallel to the wires, the wire tail gap can occur. In such a situation, the framing member or fitting, in accordance with the teachings of the present invention, could be provided with a groove adjacent its attachment edge. The frame edge would thus comprise a deformable flange portion which would seal the screen exactly as in the case of a cylindrical screen, by forcing the flange portion toward the screen wires.

I claim:

1. An assembly comprising a wire screen assembly and a fitting attached to at least one end of said wire screen assembly, said wire screen assembly including a plurality of closely spaced wire portions defining a plurality of parallel screen slots, said wire portions being rigidly attached to a plurality of underlying support rods and arranged at a non-perpendicular angle to said rods, said wire screen assembly being cut at an angle which is perpendicular to said support rods, said fitting including a body member extending longitudinally in a plane which is at least generally in the same plane as said wire screen assembly and having a flanged end portion integral therewith which is attached to said underlying support rods, said fitting having a groove in one of its planar surfaces which is adjacent to, and defines an inner side wall of said flanged end portion which is generally perpendicular to said one of its planar surfaces, at least a portion of said flange end portion being deformed longitudinally toward said screen assembly and away from said body portion so as to cause the width of any gap between the wire portions of said at least one end of said wire screen assembly and said end fitting to be no greater than the width of the screen slots formed between said wire portions.

2. An assembly of the type described in claim 1 wherein said wire screen assembly and fitting are each of a generally cylindrical shape and said groove is located in the outer wall of said body portion and extends circumferentially thereof.

* * * * *